United States Patent
Emmanuel et al.

(10) Patent No.: US 12,437,766 B2
(45) Date of Patent: *Oct. 7, 2025

(54) AUTOCORRECTION OF PRONUNCIATIONS OF KEYWORDS IN AUDIO/VIDEOCONFERENCES

(71) Applicant: Adeia Guides Inc., San Jose, CA (US)

(72) Inventors: Daina Emmanuel, Bangalore (IN); Padmassri Chandrashekar, Karnataka (IN)

(73) Assignee: Adeia Guides Inc., San Jose, CA (US)

( * ) Notice: Subject to any disclaimer, the term of this patent is extended or adjusted under 35 U.S.C. 154(b) by 71 days.

This patent is subject to a terminal disclaimer.

(21) Appl. No.: 18/215,580

(22) Filed: Jun. 28, 2023

(65) Prior Publication Data

US 2023/0343343 A1 Oct. 26, 2023

Related U.S. Application Data

(63) Continuation of application No. 17/363,824, filed on Jun. 30, 2021, now Pat. No. 11,727,940.

(51) Int. Cl.
*G10L 17/00* (2013.01)
*G10L 17/14* (2013.01)
(Continued)

(52) U.S. Cl.
CPC .............. *G10L 17/14* (2013.01); *G10L 17/22* (2013.01); *G10L 19/167* (2013.01); *G10L 25/57* (2013.01); *H04L 65/403* (2013.01)

(58) Field of Classification Search
CPC ....... G10L 15/06; G10L 15/063; G10L 15/07; G10L 15/08; G10L 15/20; G10L 2015/0631–0638; G10L 2015/221–228; G10L 15/22; G10L 15/30; G10L 2015/223; G10L 2015/088; G10L 2015/086; G10L 15/00; G10L 15/222; G10L 2015/225; G10L 17/14; G10L 17/22; G10L 17/24; G10L 25/78; G10L 2025/783; G10L 2025/786; G10L 25/81; G10L 25/84;
(Continued)

(56) References Cited

U.S. PATENT DOCUMENTS 8,768,782 B1   7/2014  Myslinski
10,956,120 B1  3/2021  Chundi et al.
(Continued)

OTHER PUBLICATIONS

López-Espejo, I., Tan, Z. H., Hansen, J. H., & Jensen, J. (2021). Deep spoken keyword spotting: An overview. IEEE Access, 10, 4169-4199. (Year: 2021).*

*Primary Examiner* — Edgar X Guerra-Erazo
(74) *Attorney, Agent, or Firm* — HALEY GUILIANO LLP

(57) ABSTRACT

The present disclosure relates to automatically correcting mispronounced keywords during a conference session. More particularly, the present invention provides methods and systems for automatically correcting audio data generated from audio input having indications of mispronounced keywords during an audio/videoconferencing system. In some embodiments, the process of automatically correcting the audio data may require a re-encoding process of the audio data at the conference server. In alternative embodiments, the process may require updating the audio data at the receiver end of the conferencing system.

20 Claims, 7 Drawing Sheets

(51) Int. Cl.
*G10L 17/22* (2013.01)
*G10L 19/16* (2013.01)
*G10L 25/57* (2013.01)
*H04L 65/403* (2022.01)

(58) Field of Classification Search
CPC ... G10L 25/87; G10L 25/93; G10L 2025/932; G10L 2025/935; G10L 2025/937
USPC ....... 704/231, 235, 236, 243, 244, 246, 250, 704/255
See application file for complete search history.

(56) References Cited

U.S. PATENT DOCUMENTS

| | | | |
|---|---|---|---|
| 2006/0111914 A1* | 5/2006 | van Deventer | G10L 15/30 |
| | | | 704/E15.047 |
| 2011/0282650 A1* | 11/2011 | Jennings | G10L 21/04 |
| | | | 704/E15.005 |
| 2014/0067371 A1 | 3/2014 | Liensberger | |
| 2014/0278421 A1* | 9/2014 | Komissarchik | G09B 19/06 |
| | | | 704/251 |
| 2015/0199965 A1 | 7/2015 | Leak et al. | |
| 2020/0160866 A1 | 5/2020 | Szymanski et al. | |
| 2020/0184958 A1* | 6/2020 | Norouzi | G09B 19/04 |
| 2023/0005487 A1 | 1/2023 | Emmanuel et al. | |

\* cited by examiner

AUTOCORRECTION OF PRONUNCIATIONS OF KEYWORDS IN AUDIO/VIDEOCONFERENCES

CROSS-REFERENCE TO RELATED APPLICATION

This application is a continuation of U.S. patent application Ser. No. 17/363,824, filed Jun. 30, 2021, the disclosure of which is hereby incorporated by reference herein in its entirety.

FIELD

The present disclosure relates to automatically correcting mispronounced keywords during a conference session. More particularly, the present invention provides methods and systems for automatically correcting audio data generated from audio input having indications of mispronounced keywords during an audio/videoconferencing system.

BACKGROUND

Advancements in communication technology have improved the ability of users to communicate (e.g., such as via videoconferencing) with colleagues, family and friends located in different physical locations than the user. For example, conferencing systems (e.g., Microsoft Teams™, Zoom™, etc.) are often used to enable colleagues in separate, geographically distributed physical locations to have a face-to-face conversation via a videoconference. In some circumstances, multiple devices in a single location may be joined to a conference (e.g., in a physical conference room at an office), and other users in different geographical locations may also be participating in the conference over a network. However, with the globalization of digital communications, it has become difficult to correct someone's mispronunciation of a word, such as a participant's name, due to technical concerns. Furthermore, the mispronunciation of words may be distracting and irritating to users participating in the conference.

SUMMARY

According to a first aspect, a method is provided for automatically correcting pronunciations of keywords for a video or audioconference. The method comprises a step of receiving audio input from a first user at a first device and generating, at the first device, a first audio data comprising a first audio signal based on the audio input. The generated first audio data may be transmitted to the server. The method further comprises a step of identifying, at the server, one or more portions of the first audio data, each comprising an indication of a mispronounced keyword and corresponding timestamp data associated with the one or more portions of the first audio data. The method further comprises a step of generating a corrected audio portion for each of the one or more portions of the first audio data, wherein the corrected audio portion comprises a correction of the mispronounced keyword and correcting, for output at a second device, the first audio data, wherein the correction comprises correcting the one or more portions of the first audio data with the respective corrected audio portion at the corresponding timestamp.

In some examples, the step of identifying, at the server, one or more portions of the first audio data comprising an indication of a mispronounced keyword comprises referencing a database comprising correct pronunciations of keywords and determining, based on referencing, for each of the one or more portions of the first audio data, the indication of the mispronounced keyword.

In some examples, the correction of the first audio data is processed at the server.

In some examples, the processing of the correction of the first audio data at the server comprises re-encoding, at the server, the first audio data based on the correction of the one or more portions of the first audio data and transmitting the re-encoded first audio data comprising the corrected audio portion to the second device for output.

In some examples, the correcting of the first audio data is processed at the second device.

In some examples, the correction of the first audio data at the second device comprises transmitting, from the server, the first audio data to the second device, wherein the first audio data comprises a reference to a second audio data for correcting the one or more portions of the first audio data with the respective corrected audio portion and transmitting, in parallel with the first audio data, the second audio data comprising the corrected audio portion for each of the one or more portions of the first audio data.

In some examples, the correction of the first audio data at the second device further comprises decoding, at the second device, the first audio data and the second audio data and correcting, at the second device, the first audio data, wherein the correction comprises correcting the one or more portions of the first audio data with the respective corrected audio portion of the second audio data.

In some examples, the one or more keywords comprise any one or more of: names of people, names of locations, domain specific keywords, keywords related to an organization of the first user, keywords related to an organization of the second user.

In some examples, the method further comprises determining an audio signature for the first user and generating the corrected audio portion based on the determined audio signature.

According to a second aspect, a system is provided for correcting incorrect pronunciations of keywords during a video or audioconference. The system comprises control circuitry to perform the steps of the method according to the first aspect.

According to a further aspect, a non-transitory computer-readable medium is provided having instructions encoded thereon for carrying out a method according to the method of the first aspect.

It will be appreciated that other features, aspects and variations of the present invention will be apparent from the disclosure herein of the drawings and detailed description. Additionally, it will be further appreciated that additional or alternative embodiments may be implemented within the principles set out by the present disclosure.

BRIEF DESCRIPTION OF THE DRAWINGS

The above and other objects and advantages of the disclosure will be apparent upon consideration of the following detailed description, taken in conjunction with the accompanying drawings, in which.

The figures herein depict various embodiments of the disclosed invention for purposes of illustration only. It will be appreciated that additional or alternative structures, systems and methods may be implemented within the principles set out by the present disclosure.

DETAILED DESCRIPTION

In view of the foregoing, the present disclosure proposes methods and systems for automatically correcting audio data generated from audio input having indications of mispronounced words/keywords for output to one or more listeners at receiving devices of an audio/videoconferencing system.

Figure 1:
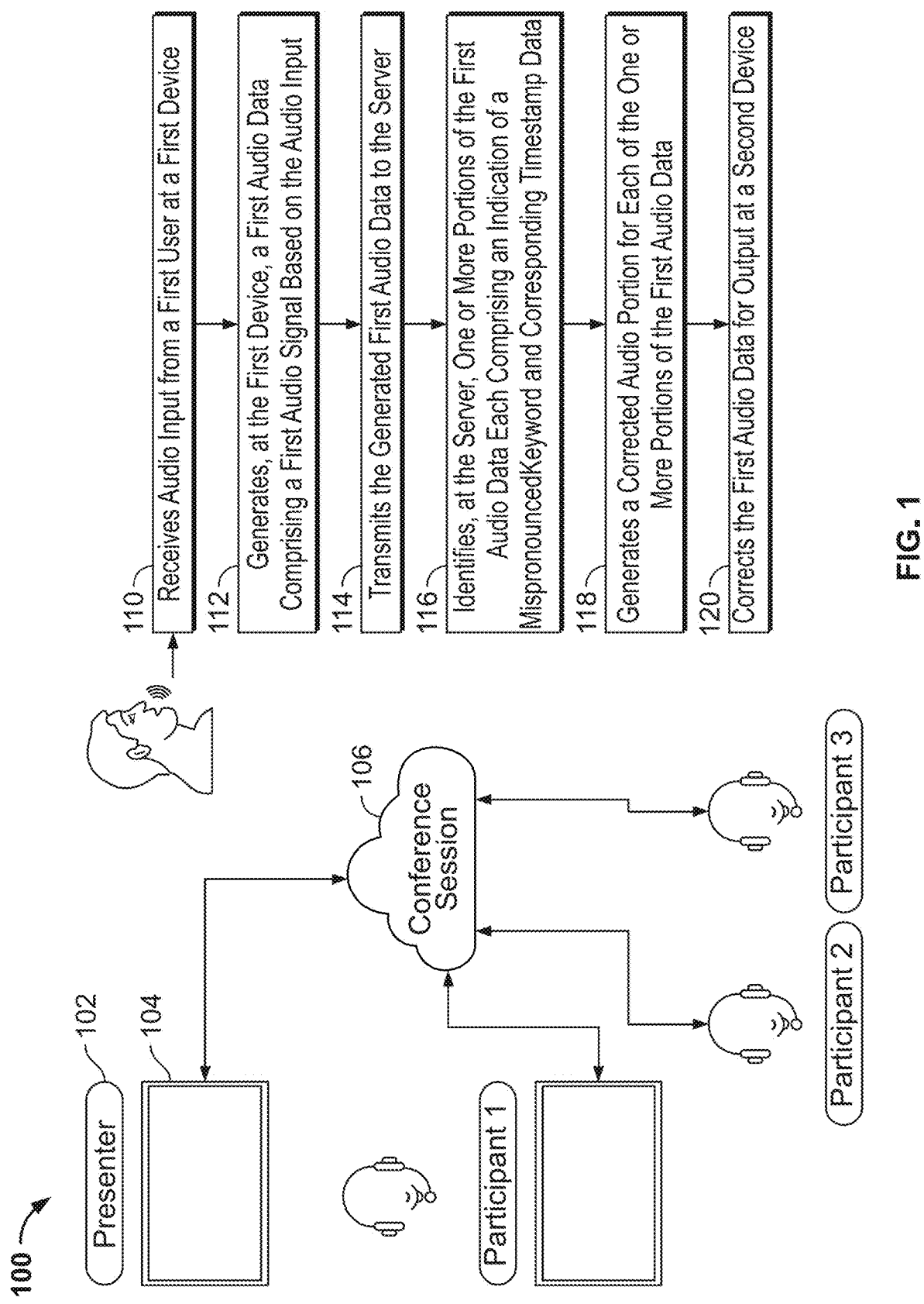
FIG. 1 shows a flowchart of a detailed illustrative process for automatically correcting a user's mispronunciation of keywords during a conference, in accordance with some embodiments of this disclosure.

FIG. 1. depicts an exemplary audio/videoconference setup 100 with participants 1-3 connected with a presenter 102 via a conference session 106. An example display screen of the presenter's user device 104 is shown, which is in communication with a conference server. FIG. 1 further shows a flowchart of a detailed illustrative process for automatically correcting audio data having indications of mispronounced keywords during a conference session, in accordance with some embodiments of this disclosure. In addition, one or more steps of the process of FIG. 1 may be incorporated into or combined with one or more steps of any other process or embodiment (e.g., process 600 of FIG. 6 and/or process 700 of FIG. 7) described herein.

Figure 2:
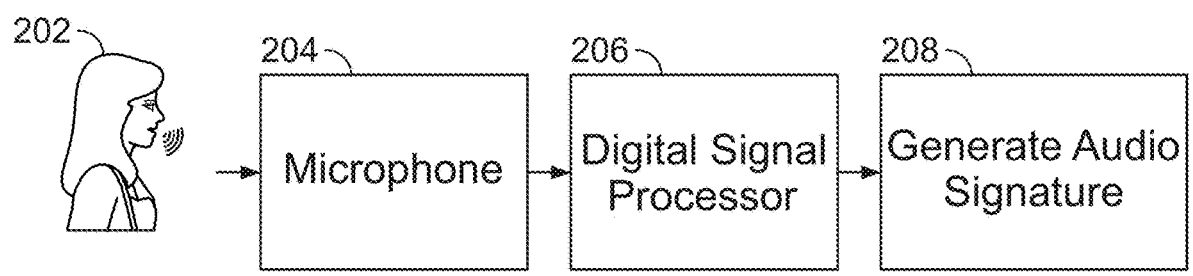
FIG. 2 shows an example of generating an audio signature, in accordance with some embodiments of this disclosure.

At step 110, the system receives audio input from a presenter or user. As shown in FIG. 2, microphone 204 may receive audio input 202 (e.g., a voice of a user in the conference, background noise, music, recorded audio, and/or other suitable audio signals). The detected audio input 202 may include frequencies in a range of 20 Hz to 20 kHz (e.g., the sound wave frequency that may be heard by the human ear). In some embodiments, audio input 202 may be sampled at regular intervals (e.g., periods of 1-2 seconds with samples taken every few milliseconds during the period). For example, audio input 202 may be various segments of the audio of the conference. It will be appreciated that any of participant shown in FIG. 1 may alternatively be a presenter during the conference session, and the presenter 102 shown in FIG. 1 may alternatively be a participant of the conference session.

At step 112, the system generates, at the user's device at which the audio input was received, audio data comprising an audio signal based on the received audio input. In example embodiments, the audio input 202 may be converted into an electrical audio signal. For example, the audio signal may be generated at a first user device as a first user speaks into a microphone to communicate with one or more participants of the conference session. The electrical audio signal output by the microphone 204 may be an analog output, and may be digitized at digital signal processor 206 to facilitate further processing, for example. In some embodiments, the microphone 204 may be a MEMS microphone with a digital output. The digital signal processor 206 (e.g., included in a general-purpose microprocessor or a specialized digital signal processor) may perform various operations on the received digital signal. In some embodiments, the digital signal processor 206 may perform a fast Fourier transform operation on time-domain samples of the audio to produce a frequency-domain representation of the audio. In some embodiments, the digital signal processor 206 may employ audio compression techniques, to reduce network resources and/or computing power to process the signal. In some embodiments, noise reduction techniques may be employed (e.g., in a pre-processing stage) to filter out unwanted signals.

In some examples, an audio signature of the speaker/presenter may be generated, as shown at step 208 of FIG. 2. The generated audio signature 208 may comprise a time-domain and/or frequency-domain representation (e.g., a spectrogram) of the signal. In some embodiments, digital signal processing including frequency analysis, peak volume detecting, audio hashing, waveform matching, and/or any other digital signal processing method known to those skilled in the art may be used to generate an audio signature. As another example, the audio signature may comprise an audio signature or hash calculation deterministically generated from a predefined portion of the audio signal.

At step 114, the generated audio data is transmitted to the conference server. For example, the audio data transmitted to the conference server may be sent as compressed audio data. For example, the device (e.g., device 104 of FIG. 1) associated with the user (e.g., presenter 102 of FIG. 1) may transmit an encoded time/frequency-domain representation of the signal to a conference server and receive and decode a time/frequency-domain representation of the audio signal.

In some embodiments, the conference server may generate a features vector based on the output of the digital signal processor 206, and audio signature 208 may correspond to such features vector. For example, the features vector may comprise a sequence of values representing various audio or acoustic features or characteristics (e.g., amplitude, modulation, tone, frequency, volume, speed, etc.) of the signal. Audio processing circuitry may analyze audio characteristics of the signal to identify audio signatures using any suitable audio analysis technique (e.g., frequency analysis to determine a base frequency and unique harmonic pattern of a particular voice, phoneme analysis to determine an accent of a particular voice, etc.). For example, the wave amplitude of the audio signal may be used to determine the volume of the voice of user 202 and/or analyze frequency data to determine the pitch and tone of the voice. The audio processing circuitry may also identify non-vocal audio such as music, sound effects, and the like using similar frequency analysis techniques or any other suitable method of audio analysis. The identified audio characteristics may be stored in association with a timestamp of when the audio signal was received. Audio signal processing is discussed in more detail in U.S. patent application Ser. No. 16/553,410, filed Aug. 28, 2019, which is hereby incorporated by reference herein in its entirety.

At step 116, the conference server identifies one or more portions of the audio data, each portion of the audio data comprising an indication of a mispronounced keyword by the presenter, and further identifies corresponding timestamp data associated with each portion of the audio data. In some embodiments, the system may reference a database comprising correct pronunciations of keywords and determine, based on the reference to the database of keywords, for each portion of the audio data, an indication within the audio data that a keyword has been mispronounced.

In example embodiments, based on speech analysis and speech recognition techniques, the server determines any indications of mispronounced keywords that form part of the audio data and replaces the portion of the audio data having an indication of a mispronounced keyword, in substantially real time, with a corrected portion of audio data by referencing the database of keywords. For example, upon receiving the audio data at the server end of the conference system, keywords and any mispronunciations thereof may be identified in portions of the audio data. For example, keywords may be identified at the server using processing techniques, such as NLP algorithms or any other suitable algorithm. During speech analysis, for example, portions of the audio data containing the mispronounced keywords may be identified and compared to an index or database of keywords, the index or database having an indication of a correct pronunciation of each of the keywords.

In example embodiments, the conference server may identify timestamp data at which the mispronounced keywords occur in the audio data. The timestamp associated with each mispronounced keyword within the portion of audio data that is processed at the server may be further associated with the corrected keyword signals, thereby providing a marker suitable for replacing portions of the audio data with the corrected keyword audio portion.

In some embodiments, the conference server may continuously build upon the database of correct keywords pronunciations. For example, the system may maintain a learned/cached mechanism for a frequently used set of keywords per user, industry or organization, as may be efficient. For example, the system may store and maintain in the database of keywords the organization's name, client names of the organization, employee names, director names, locations relevant to the organization such as office locations, and domain specific keywords. In some embodiments, the keyword database may further include, but not limited to, names of people/cities/states/countries. In some examples, the keywords may be specific to domain or industry where there are more complex keywords based around context. For example, some industries that may benefit from such a mechanism may include, but are not limited to, the medical industry, the pharmaceutical and life sciences industry, etc. In some embodiments, a general keyword database may be preloaded with industry-related or company related information. The system may comprise a database of keywords that may be automatically generated based on metadata associated with the conference session, e.g., meeting attendees. The database of keywords may, additionally or alternatively, be saved in the user's profile at the conference server, to be provided for access for future audio/videoconference sessions. In some examples, one or more user specific databases may be updated with keywords that are commonly mispronounced by the user.

At step 118, the system generates a corrected audio portion for each portion of the audio data having an indication of a mispronounced keyword. In example embodiments, the corrected audio portion comprises a correction of the mispronounced keyword. For example, upon identifying the portions of the audio data having indications of mispronounced keywords and respective timestamps associated with said portions, corrected audio portions having corrected pronunciations of the mispronounced keywords may be determined and generated, which can be used to replace the original portion of the audio data received at the server for output at each listener's or participant's device. In preferred embodiments, the corrected audio portion may be generated using the speaker's audio signature, for example, in order to provide a fluid video/audioconferencing experience with minimal distractions for all participants of the conference session.

At step 120, the system corrects, for output at each listener's or participant's device, the audio data having the corrected audio portions at the corresponding timestamp. In some embodiments, the process described in relation to FIG. 1 of automatically correcting the audio data may require a re-encoding process of the audio data at the conference server, as described in further detail with reference to FIG. 6. In alternative embodiments, the process may require updating the audio data at the receiver end of the conferencing system. In such mechanisms, the automatic correction of keywords may be processed at the receiver end of the audio/videoconference system, as described in further detail with reference to FIG. 6.

Figure 3:
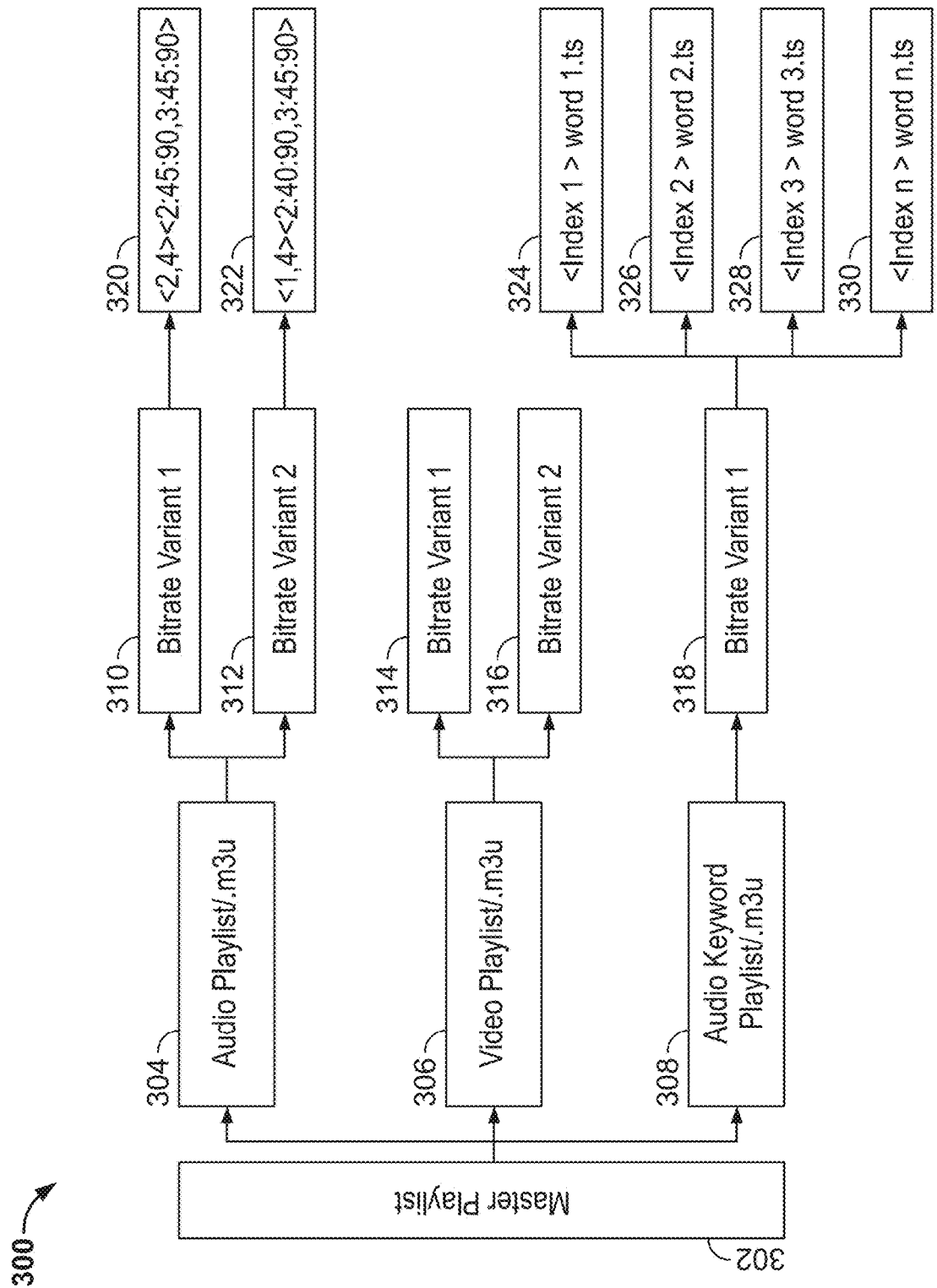
FIG. 3 shows an example timeline of the generated audio signature. In accordance with some embodiments of this disclosure.

FIG. 3 shows an illustration of an example master playlist, master playlist 302, that may be transmitted to one or more conference session participants. The master playlist may have index location identifiers and respective timestamp identifiers associated with an audio playlist 304 of the master playlist, in accordance with some embodiments of the present disclosure.

In some embodiments, the master playlist comprises at least a video playlist 306 comprising one or more bitrate variants, such as bitrate variants 314 and 316. In example embodiments, the master playlist comprises an audio playlist 304 comprising one or more bitrate variants, such as bitrate variants 310 and 312, and, in some embodiments, an audio keyword playlist 308. Furthermore, the one or more bitrate variants of the audio playlist 304 may comprise index location identifiers and respective timestamp identifiers, such as identifiers 320 and 322. In example embodiments, the audio keyword playlist 308 comprises predetermined index location identifiers and associated keyword identifiers, such as identifiers 324, 326, 328 and 330, which may be used to replace the mispronounced keywords and are transmitted as part of the audio playlist 304. It will be appreciated that, in some embodiments, instead of transmitting a separate audio keyword playlist 308 as part of the master playlist 302, the audio playlist 304 may alternatively be transmitted as a corrected or re-encoded audio playlist, as described as part of the present disclosure.

The system may output, at each participant's or listeners' device, an audio output using the corrected audio data. In some embodiments, the output audio may comprise an output audio signal having the corrected keyword signals. In some embodiments, the corrected pronunciation of keywords may be output to attendees of the audio/videoconference in the same acoustic properties of the speaker, e.g., based on the audio signature of the speaker.

The system may thus be a continuously learning and feedback mechanism to improve the database over time and also to improve the recognition of speakers' audio signatures, e.g., region-specific accents and pronunciations.

Figure 4:
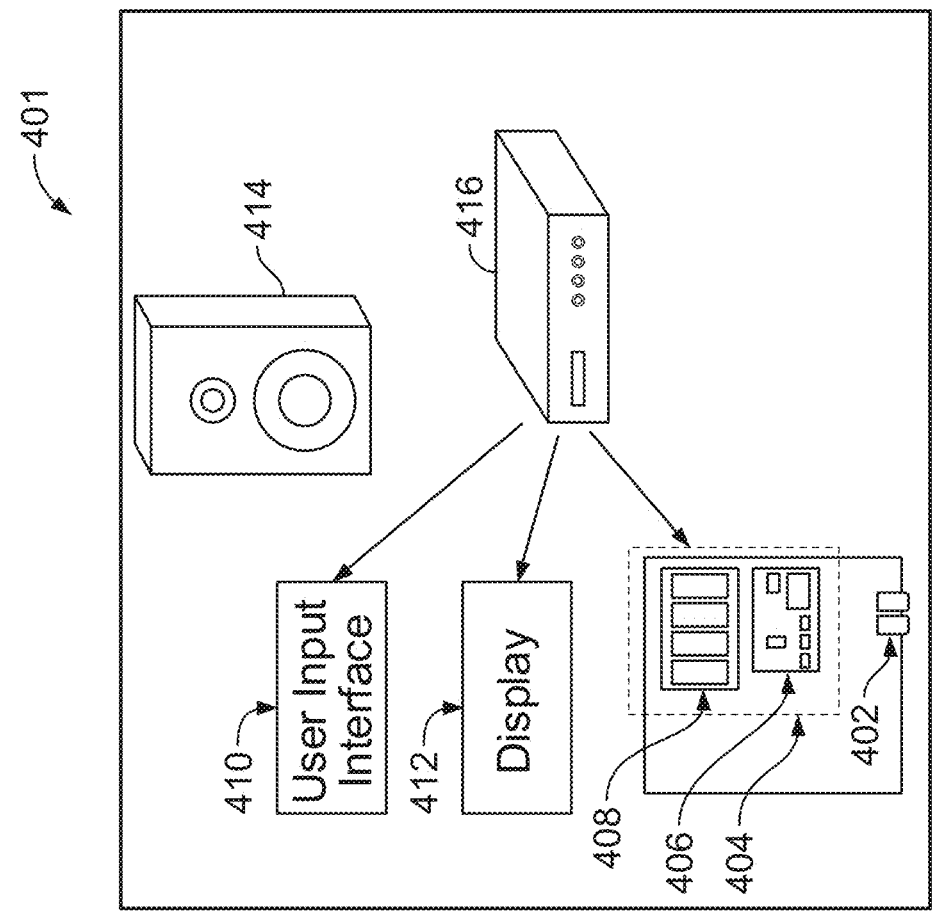
FIG. 4 is a diagram of illustrative conferencing devices, in accordance with some embodiments of this disclosure.
Figure 4:
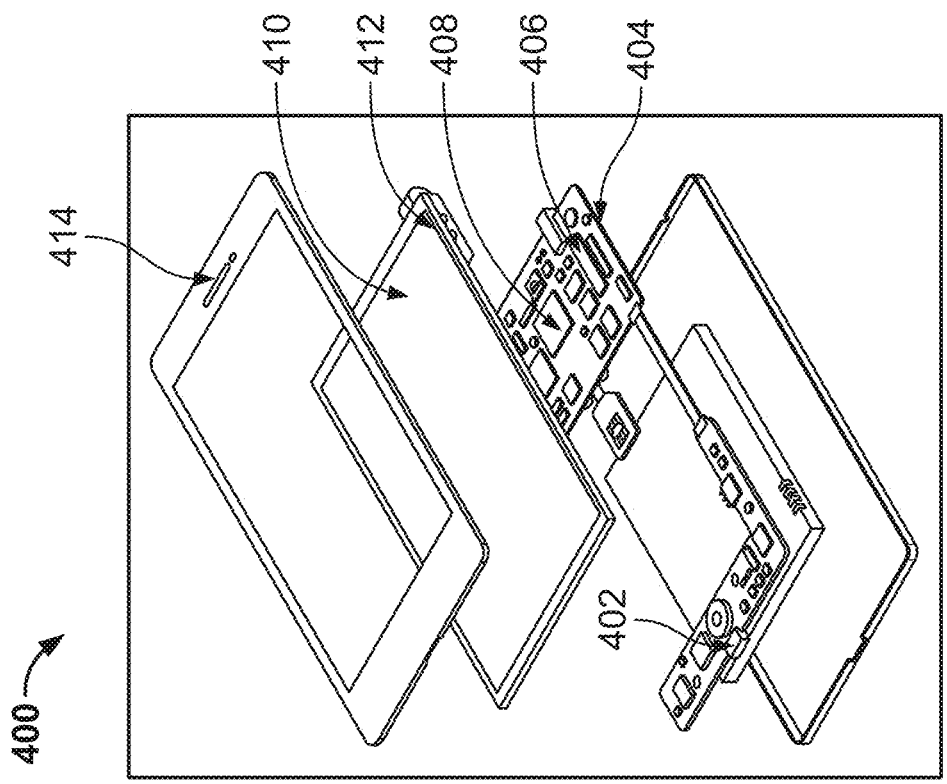

FIG. 4 shows generalized embodiments of illustrative conferencing devices 400 and 401. Any of the devices discussed in connection with the present disclosure may be implemented as conferencing devices 400 or 401. The conferencing application may be executed on any combination of conferencing device 400 and/or device 401 (e.g., locally) and/or conferencing server 508 (e.g., remotely) of FIG. 5, and the processes described herein may be performed by the conferencing application locally or remotely.

As depicted, conferencing device 400 may be a smartphone or tablet, whereas conferencing device 401 may be a conferencing system that includes equipment device 416 (e.g., a PC, set-top box, CPU, video-game console, etc.). Conferencing devices 400 and 401 may receive content and data via input/output (hereinafter "I/O") path 402 (e.g., I/O circuitry). I/O path 402 may provide content (e.g., Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O path 402 may additionally provide circuitry to control user interface 410. I/O functions may be provided by one or more of these communications paths but are shown as a single path in FIG. 4 to avoid overcomplicating the drawing.

Control circuitry 404 may be based on any suitable processing circuitry such as processing circuitry 406. As referred to herein, processing circuitry should be understood to mean any circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a conferencing system stored in memory (e.g., storage 408). Specifically, control circuitry 404 may be instructed by the conferencing system to perform the functions discussed above and below.

In client server-based embodiments, control circuitry 404 may include communications circuitry suitable for communicating with a conferencing system server (e.g., server 508 of FIG. 5) or other networks or servers. The instructions for carrying out the above-mentioned functionality may be stored on a server. Communications circuitry may include a cable modem, an integrated service digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of conferencing devices, or communication of conferencing devices in locations remote from each other.

As referred to herein, the phrase "conferencing device" and "user device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a personal computer (PC), a laptop computer, a tablet, a WebTV box, a smartphone, or any other television equipment, computing equipment, or wireless device, and/or combination of the same.

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Non-volatile memory may also be used (e.g., to launch a boot-up routine and other instructions). Cloud-based storage, described in relation to FIG. 5, may be used to supplement storage 408 or instead of storage 408.

Control circuitry 404 may include audio circuitry, video circuitry, and tuning circuitry, such as one or more analog tuners, one or more MP4 decoders or other digital decoding circuitry, or any other suitable tuning or audio circuits or combinations of such circuits. Encoding circuitry (e.g., for converting over-the-air, analog, or digital signals to audio signals for storage) may also be provided. Control circuitry 404 may also include scaler circuitry for upconverting and downconverting content into the preferred output format of the conferencing device 400. Control circuitry 404 may also include digital-to-analog converter circuitry and analog-to-digital converter circuitry for converting between digital and analog signals. The tuning and encoding circuitry may be used by the conferencing device to receive and to display, to play, or to record content. The tuning and encoding circuitry may also be used to receive guidance data. The circuitry described herein, including, for example, the tuning, audio-generating, encoding, decoding, encrypting, decrypting, scaler, and analog/digital circuitry, may be implemented using software running on one or more general purpose or specialized processors. Multiple tuners may be provided to handle simultaneous tuning functions. If storage 408 is provided as a separate device from user device 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touchscreen, touchpad, stylus input, joystick, voice recognition interface, or other user input interfaces. Display 412 may be a touchscreen or touch-sensitive display. In such circumstances, user input interface 410 may be integrated with or combined with display 412. Display 412 may be provided as a stand-alone device or integrated with other elements of each one of conferencing device 400 and device 401. Speakers 414 may be provided as integrated with other elements of each of conferencing device 400 and device 401. In the case of conferencing device 401, speakers 414 may be stand-alone units (e.g., smart speakers). The audio component of videos and other content displayed on display 412 may be played through speakers 414. In some embodiments, the audio may be distributed to a receiver (not shown), which processes and outputs the audio via speakers 414.

The conferencing application may be implemented using any suitable architecture. For example, it may be a stand-alone application wholly implemented on conferencing device 400 and/or 401. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410.

In some embodiments, the conferencing application is a client/server-based application. Data for use by a thick or thin client implemented on device 400 or device 401 may be retrieved on demand by issuing requests to a server (e.g., conferencing server 508 of FIG. 5) remote to the device 400 or device 401. In one example of a client/server-based conferencing application, control circuitry 404 runs a web browser that interprets web pages provided by a remote server (e.g., conferencing server 508). For example, the remote server may store the instructions for the application in a storage device. The remote server may process the stored instructions using circuitry (e.g., control circuitry 404) and generate the displays discussed above and below. The user device may receive the displays generated by the remote server and may display the content of the displays locally on device 400 or device 401. This way, the processing of the instructions is performed remotely by the server while the resulting displays are provided locally on device 400 or device 401. Device 400 or device 401 may receive inputs from the user via input interface 410 and transmit those inputs to the remote server for processing and generating the corresponding displays. For example, device 400 or device 401 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to device 400 or device 401 for presentation to the user.

In some embodiments, the conferencing application is downloaded and interpreted or otherwise run by an interpreter or virtual machine (run by control circuitry 404). In some embodiments, the application may be encoded in the ETV Binary Interchange Format (EBIF), received by control circuitry 404 as part of a suitable feed, and interpreted by a user agent running on control circuitry 404. For example, the application may be an EBIF application. In some embodiments, the guidance application may be defined by a series of Java-based files that are received and run by a local virtual machine or other suitable middleware executed by control circuitry 404. In some of such embodiments (e.g., those employing MPEG-2 or other digital media encoding schemes), the application may be, for example, encoded and transmitted in an MPEG-2 object carousel with the MPEG audio and video packets of a program.

Figure 5:
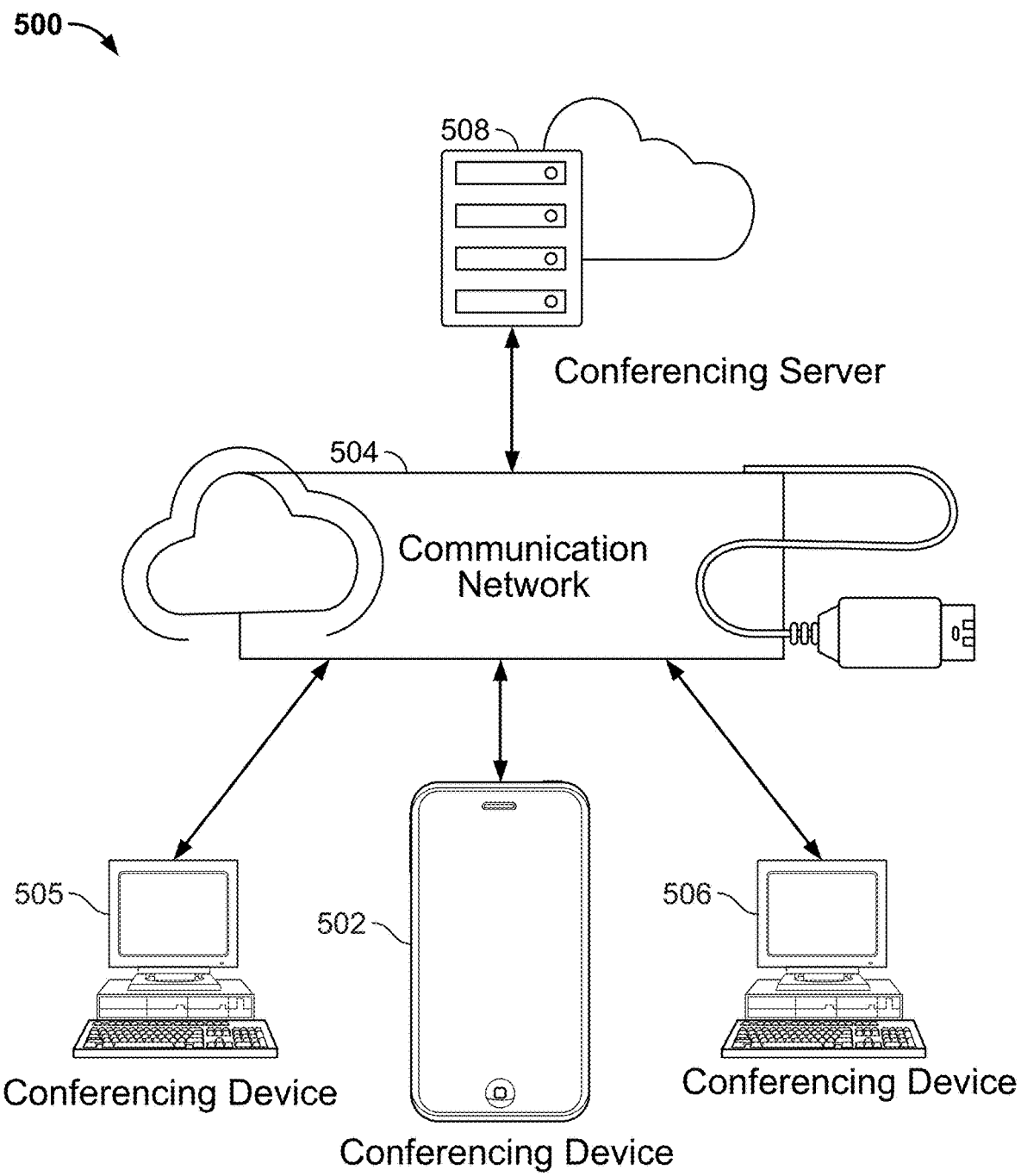
FIG. 5 is a diagram of an illustrative conferencing system, in accordance with some embodiments of this disclosure.

Conferencing device 400 and conferencing device 401 of FIG. 4 can be implemented in system 500 of FIG. 5 as any combination of conferencing device 502, conferencing device 505, or conferencing device 506. Conferencing devices, on which a conferencing system may be implemented, may function as stand-alone devices or may be part of a network of devices. Conferencing server 508 may have a similar configuration to conferencing device 401, although conferencing server 508 may not include certain elements (e.g., a display, a user interface, speakers, etc.). Various network configurations of devices may be implemented and are discussed in more detail below.

In system 500, as shown in FIG. 5, there may be multiple conferencing devices, but only three are shown in FIG. 5 to avoid overcomplicating the drawing. In addition, each user may utilize more than one type of conferencing device and also more than one of each type of conferencing device. Conferencing devices 502, 505, 506 may be coupled to communication network 504. Communication network 504 may be one or more networks including the Internet, a mobile phone network, mobile voice or data network (e.g., a 4G or LTE network), cable network, public switched telephone network, or other types of communications network or combinations of communications networks. Conferencing server 508, and conferencing devices 502, 505, 506 may be coupled to communications path 504 via one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths.

Although communications paths are not drawn between conferencing devices 502, 505, 506, and conferencing server 508, these devices may communicate directly with each other via communications paths, such as short-range point-to-point communications paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The conferencing devices may also communicate with each other through an indirect path via communication network 504.

Conferencing applications may be, for example, stand-alone applications implemented on conferencing devices. For example, the conferencing application may be implemented as software or a set of executable instructions, which may be stored in storage 408 and executed by control circuitry 404 of a conferencing device 502, 505, 506. In some embodiments, conferencing systems may be client server applications where only a client application resides on the conferencing device, and a server application resides on conferencing server 508. For example, conferencing systems may be implemented partially as a client application on control circuitry 404 of conferencing devices 502, 505, 506 and partially on conferencing server 508 as a server application running on control circuitry of conferencing server 508.

When executed by control circuitry of conferencing server 508, the conferencing application may instruct the control circuitry to capture audio, generate audio signatures (e.g., based on captured audio), join a device to the conference, and generate the conferencing system output (e.g., a video feed of the conference, audio feed of the conference, text chat or other functionalities for the conference, etc.) and transmit a conference ID (e.g., to a device newly joined to a conference) and the generated output to conferencing devices 502, 505, 506. The client application may instruct control circuitry of the receiving conferencing devices 502, 505, 506 to generate the conferencing system output.

Conferencing devices 502, 505, 506 may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." Cloud resources may be accessed by conferencing device 502, 505, 506 using, for example, a web browser, a conferencing system, a desktop application, a mobile application, and/or any combination of access applications of the same. Conferencing devices 502, 505, 506 may be a cloud client that relies on cloud computing for application delivery, or the conferencing device may have some functionality without access to cloud resources.

For example, some applications running on conferencing device 502, 505, 506 may be cloud applications, i.e., applications delivered as a service over the Internet, while other applications may be stored and run on the conferencing device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, conferencing devices can use cloud resources for processing operations such as the processing operations performed by processing circuitry described in relation to FIG. 4.

Figure 6:
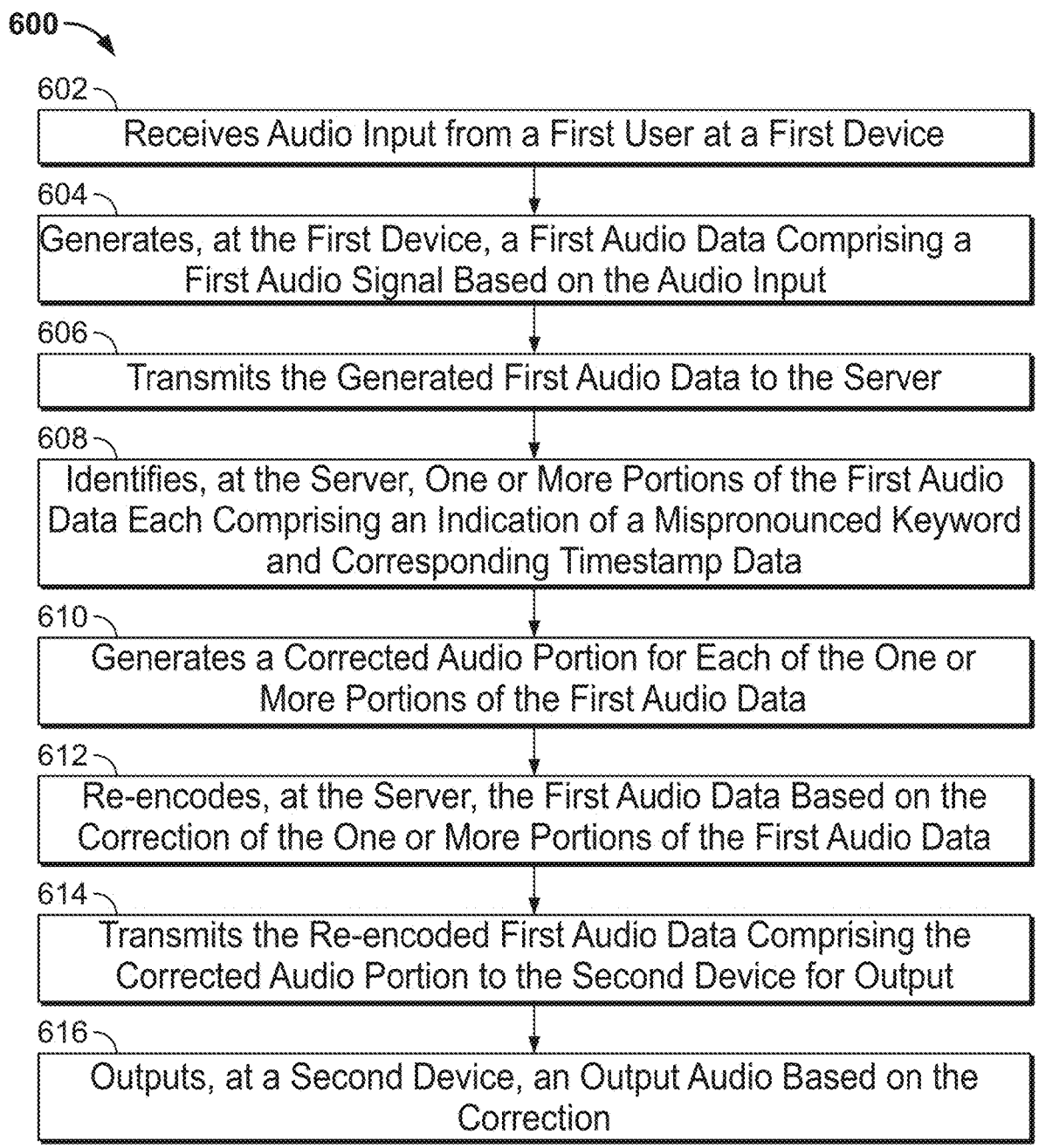
FIG. 6 and FIG. 7 show flowcharts of a detailed illustrative process for automatically correcting a user's mispronunciation of keywords during a conference, in accordance with some embodiments of this disclosure.

FIG. 6 shows a flowchart 600 of a detailed illustrative process, implemented at a server, for automatically correcting a user's mispronunciation of keywords during a conference, in accordance with some embodiments of this disclosure. It should be noted that process 600 or any step thereof could be performed on, or provided by, any of the devices shown in FIGS. 4-5. For example, process 600 may be executed by devices 502, 505, 506 (e.g., via control circuitry 404) and/or control circuitry of conferencing server 508, as instructed by a conferencing application that may be implemented on conferencing device 502, and/or conferencing device 505 and/or conferencing device 506 and/or conferencing server 508, such as to distribute control of database management application operations for a target device among multiple devices. In addition, one or more steps of process 600 may be incorporated into or combined with one or more steps of any other process or embodiment (e.g., process of FIG. 1).

In the example of FIG. 6, corresponding to embodiments according to processing the autocorrection of keywords at the server-side, the audio data/portion needs to be re-encoded before it is transmitted in order to update the keywords with corrected keywords.

In example embodiments, control circuitry of a conferencing server (e.g., server 508 of FIG. 5) may establish a conference (e.g., conference 105 of FIG. 1) via a communication network (e.g., network 504 of FIG. 5). For example, the conferencing server may communicate with users via one or more devices (e.g., devices 502, 505, 506 of FIG. 5) to set up the conference. The conference may include multiple participants from several different physical locations, and at any of such locations there may be a single user or multiple users present (e.g., communicating via a single device in a conference room, or communicating via multiple devices). The conference may be associated with a unique conference ID stored at the conferencing server, and such conference ID may be communicated to each of the devices to enable the devices to join the conference.

At step 602, the system receives audio input from a presenter or user. For example, a microphone of each of one or more devices (e.g., devices 502, 505, 506 of FIG. 5) joined to the conference may capture audio signals of voices of users in the conference.

At step 604, the system generates, at the user's device at which the audio input was received, audio data comprising an audio signal based on the received audio input. In example embodiments, the audio input may be converted into an electrical audio signal. For example, the audio signal may be generated at a first user device as a first user speaks into a microphone to communicate with one or more participants of the conference session.

At step 606, the generated audio data is transmitted to the conference server. For example, the audio data transmitted to the conference server may be sent as compressed audio data. In some embodiments, the captured audio signal may be transmitted from each of the devices 502, 505, 506 joined to the conference at the same time, or at various predetermined times. The captured audio signals may be transmitted to the conferencing server each time the audio is sampled by the respective devices.

At step 608, the conference server identifies one or more portions of the audio data, each portion of the audio data comprising an indication of a mispronounced keyword by the presenter, and further identifies corresponding timestamp data associated with each portion of the audio data. In some embodiments, the system may reference a database comprising correct pronunciations of keywords and determine, based on the reference to the database of keywords, for each portion of the audio data, an indication within the audio data that a keyword has been mispronounced.

At step 610, the system generates a corrected audio portion for each portion of the audio data having an indication of a mispronounced keyword. In example embodiments, the corrected audio portion comprises a correction of the mispronounced keyword. For example, upon identifying the portions of the audio data having indications of mispronounced keywords and respective timestamps associated with said portions, corrected audio portions having corrected pronunciations of the mispronounced keywords may be determined and generated, which can be used to replace the original portion of the audio data received at the server for output at each listener's or participant's device. In preferred embodiments, the corrected audio portion may be generated using the speaker's audio signature, for example, in order to provide a fluid video/audioconferencing experience with minimal distractions for all participants of the conference session.

At step 612, the system re-encodes, at the conference server, the first audio data based on the correction of the one or more portions of the first audio data. Thus, the conference server corrects, for output at each listener's or participant's device, the audio data having the corrected audio portions at the corresponding timestamp.

In this example, the system generates a corrected audio portion for each portion of the audio data having an indication of a mispronounced keyword, and carries out the automatic correction at the conference server. For example, upon identifying the portions of the audio data having indications of mispronounced keywords and respective timestamps associated with said portions, corrected audio portions having corrected pronunciations of the mispronounced keywords may be determined and generated. The corrected audio portions are then used to replace the original portion of the audio data received at the server for output at each listener's or participant's device.

In preferred embodiments, the corrected audio portion may be generated using the speaker's audio signature, for example, in order to provide a fluid video/audioconferencing experience with minimal distractions for all participants of the conference session. For example, the system may continuously analyze the incoming speech for mispronounced keywords and replace them with the right pronunciation, while retaining the audio signature of the user, e.g., acoustic properties of the environment and the speaker's voice and accent. The pronunciation may be corrected and applied in the context of the speaker's voice, pitch, duration or speed, intensity, voice quality and accent, etc., which can be assessed and determined as described in relation to FIG. 2 above.

For example, control circuitry of the conferencing server (and/or digital signal processor 206 of FIG. 2) may generate audio signatures based on the audio signals (e.g., received via I/O path 402 of FIG. 4), such as in accordance with the techniques discussed in connection with FIG. 2. For example, audio modulations of the received signals may be compressed into audio signatures. Various digital signal processing algorithms may be used (e.g., fast Fourier transform) in generating the audio signatures. The audio signature may be generated for each audio signal received by the conferencing server from the devices joined to the conference, and audio signals may be transmitted to the server (e.g., at predetermined times, for the purposes of generating audio signatures) until the conclusion of the conference session.

In some embodiments, control circuitry of conferencing server (e.g., server 508 of FIG. 5) may store (e.g., in storage 408 of FIG. 4) the generated audio signatures in connection with the conference ID associated with the conference. In addition to the conference ID, the generated signatures may be associated and/or tabulated with device IDs respectively associated with devices joined to the conference, and a timestamp associated with each audio signature. It should be noted that the conferencing server may store any number of conference IDs for various ongoing conferences (e.g., within particular organizations, across multiple organizations, etc.).

At step 614, the system transmits, from the conference server, the re-encoded audio data comprising the corrected audio portion to the second device for output. The encoded audio is signaled to the receiver, and the same is played back/heard as a normal audio data with no changes needed at the receiver end of the audio/videoconference system.

At step 616, the system outputs, at a second device, an output audio based on the correction. When rendered out, the audio would be with corrected keywords. Thus, in this approach, the autocorrection would take place at the server before it transmits the corrected audio portion to the receiver devices.

Figure 7:
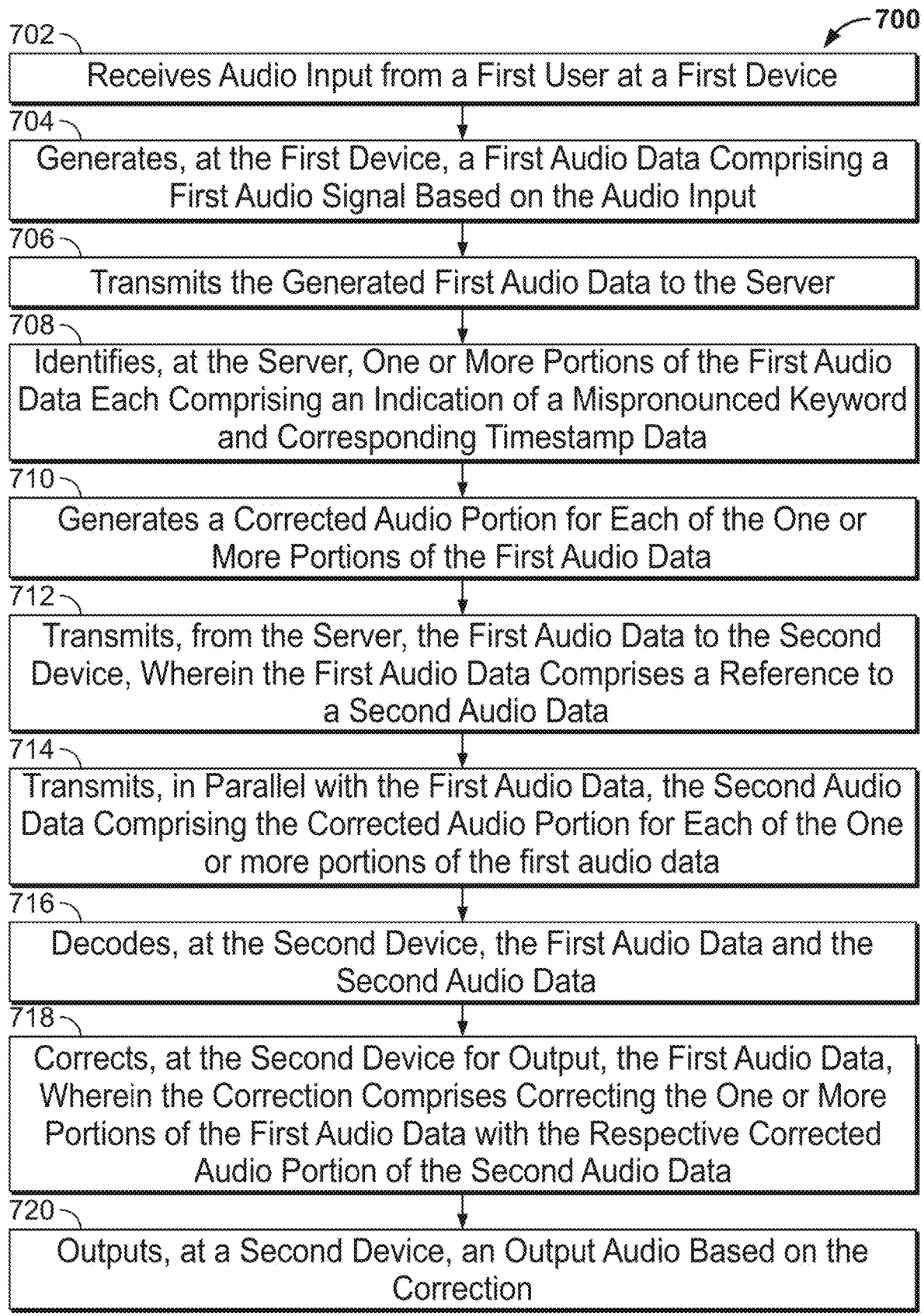

FIG. 7 shows a flowchart 700 of a detailed illustrative process, implemented at a server, for automatically correcting a user's mispronunciation of keywords during a conference, in accordance with some embodiments of this disclosure. It should be noted that process 700 or any step thereof could be performed on, or provided by, any of the devices shown in FIGS. 4-5. For example, process 700 may be executed by devices 502, 505, 506 (e.g., via control circuitry 404) and/or control circuitry of conferencing server 508, as instructed by a conferencing application that may be implemented on conferencing device 502, and/or conferencing device 505 and/or conferencing device 506 and/or conferencing server 508, such as to distribute control of database management application operations for a target device among multiple devices. In addition, one or more steps of process 700 may be incorporated into or combined with one or more steps of any other process or embodiment (e.g., process of FIG. 1).

In the example of FIG. 7, corresponding to embodiments according to processing autocorrection of keywords at the receiver-side, the audio data/portions are transmitted alongside separately transmitted audio keyword data/portions, e.g., as separate playlists as part of a master playlist, in order to update the keywords with corrected keywords at the receiver's device.

In example embodiments, control circuitry of a conferencing server (e.g., server 508 of FIG. 5) may establish a conference (e.g., conference 105 of FIG. 1) via a communication network (e.g., network 504 of FIG. 5). For example, the conferencing server may communicate with users via one or more devices (e.g., devices 502, 505, 506 of FIG. 5) to set up the conference. The conference may include multiple participants from several different physical locations, and at any of such locations there may be a single user or multiple users present (e.g., communicating via a single device in a conference room, or communicating via multiple devices). The conference may be associated with a unique conference ID stored at the conferencing server, and such conference ID may be communicated to each of devices to enable the devices to join the conference.

At step 702, the system receives audio input from a presenter or user. For example, a microphone of each of one or more devices (e.g., devices 502, 505, 506 of FIG. 5) joined to the conference may capture audio signals of voices of users in the conference.

At step 704, the system generates, at the user's device at which the audio input was received, audio data comprising an audio signal based on the received audio input. In example embodiments, the audio input may be converted into an electrical audio signal. For example, the audio signal may be generated at a first user device as a first user speaks into a microphone to communicate with one or more participants of the conference session.

At step 706, the generated audio data is transmitted to the conference server. For example, the audio data transmitted to the conference server may be sent as compressed audio data. In some embodiments, the captured audio signal may be transmitted from each of the devices joined to the conference at the same time, or at various predetermined times. The captured audio signals may be transmitted to the conferencing server each time the audio is sampled by the respective devices.

At step 708, the conference server identifies one or more portions of the audio data, each portion of the audio data comprising an indication of a mispronounced keyword by the presenter, and further identifies a corresponding timestamp data associated with each portion of the audio data. In some embodiments, the system may reference a database comprising correct pronunciations of keywords and determine, based on the reference to the database of keywords, for each portion of the audio data, an indication within the audio data that a keyword has been mispronounced.

At step 710, the system generates a corrected audio portion for each portion of the audio data having an indication of a mispronounced keyword. In example embodiments, the corrected audio portion comprises a correction of the mispronounced keyword. For example, upon identifying the portions of the audio data having indications of mispronounced keywords and respective timestamps associated with said portions, corrected audio portions having corrected pronunciations of the mispronounced keywords may be determined and generated, which can be used to replace the original portion of the audio data received at the server for output at each listener's or participant's device. In preferred embodiments, the corrected audio portion may be generated using the speaker's audio signature, for example, in order to provide a fluid video/audioconferencing experience with minimal distractions for all participants of the conference session.

At step 712, the conference server transmits the first audio data to the second device, wherein the first audio data comprises a reference to a second audio data. At step 714, the conference server transmits, in parallel with the first audio data, the second audio data comprising the corrected audio portion for each of the one or more portions of the first audio data. For example, the conference server may transmit the first audio data to the second device and a second audio data comprising the corrected keyword signal for correcting each of the one or more keywords at the second device. The second audio data, which comprises encoded corrected audio portions, may be signaled as a separated playlist/track for decoding (e.g., Audio Keyword Playlist 308 as shown in FIG. 3). Along with the original audio data (e.g., Audio Playlist 304 as shown in FIG. 3), a reference to an index to the corrected keywords may also be signaled for each portion of the audio data.

At step 716, the system decodes, at the second device, the initial audio data and the corrected audio data. Thus, at the receiver end of the conference system, both the original audio portions (without corrections) and the corrected audio portions are decoded for output. For example, at the receiver end, each portion of the Audio Playlist 304 may be parsed, and the index or keyword identifier may be retrieved from the URL present in the playlist by referencing the corrected audio portions of the Audio Keyword Playlist 308, for example.

At step 718, the system corrects, at the second device for output, the first audio data, wherein the correction comprises correcting the one or more portions of the first audio data with the respective corrected audio portion of the second audio data. Therefore, when the audio is rendered at the receiving device, the rendering logic may be updated such that the decoded portions of audio data where the mispronounced keyword occurs are replaced with decoded portions of the corrected audio portions having corrected keyword pronunciations at the respective timestamps, as shown in FIG. 3.

At step 720, the system outputs, at a second device, an output audio based on the correction. When rendered out, the audio would be with corrected keyword. Thus, in this approach, the autocorrection would take place at the receiver end of the system.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments that fall within the scope of the claims.

Throughout the description and claims of this specification, the words "comprise" and "contain" and variations of them mean "including but not limited to," and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

What is claimed is:

1. A method comprising:
   receiving audio data from a conference;
   performing speech analysis and speech recognition on the audio data;
   based on the speech analysis and the speech recognition, determining an indication of a mispronounced keyword that forms a part of the audio data;
   replacing the portion of the audio data having the indication of the mispronounced keyword, in substantially real time, with a corrected portion of the audio data by referencing a database of keywords; and
   transmitting an audio playlist comprising one or more bitrate variants as a corrected or re-encoded audio playlist.

2. The method of claim 1,
   wherein the receiving of the audio data from the conference occurs at a server of a conference system hosting the conference, and
   wherein, upon receiving the audio data at the server of the conference system, performing the determining of the indication of the mispronounced keyword that forms the part of the audio data.

3. The method of claim 1, wherein the database of keywords includes an indication of a correct pronunciation of each of the keywords.

4. The method of claim 1, comprising:
transmitting a master playlist including an audio keyword playlist to one or more participants in the conference.

5. The method of claim 4, wherein the master playlist includes the audio data, an index location identifier, and a respective timestamp identifier associated with the audio data.

6. The method of claim 4,
wherein the master playlist includes one or more bitrate variants, and
wherein the replacing of the portion of the audio data having the indication of the mispronounced keyword, in substantially real time, with the corrected portion of the audio data is performed by referencing the master playlist including the one or more bitrate variants.

7. The method of claim 4,
wherein the master playlist includes the audio playlist comprising one or more bitrate variants,
wherein the one or more bitrate variants of the audio playlist comprises index location identifiers and respective timestamp identifiers.

8. The method of claim 4, comprising:
transmitting the audio data alongside separately transmitted audio keyword data as separate playlists as part of the master playlist including the audio keyword playlist, in order to update the portion of the audio data having the indication of the mispronounced keyword with a corrected portion of the audio data.

9. The method of claim 1, comprising:
decoding, at a receiver of the conference, both the audio data without corrections and the corrected audio data.

10. A system comprising:
circuitry configured to:
receive audio data from a conference;
perform speech analysis and speech recognition on the audio data;
based on the speech analysis and the speech recognition, determine an indication of a mispronounced keyword that forms a part of the audio data;
replace the portion of the audio data having the indication of the mispronounced keyword, in substantially real time, with a corrected portion of the audio data by referencing a database of keywords; and
transmit an audio playlist comprising one or more bitrate variants as a corrected or re-encoded audio playlist.

11. The system of claim 10, comprising:
a server of a conference system hosting the conference, wherein the circuitry is configured to:
receive the audio data from the conference at the server of the conference system hosting the conference; and
upon receiving the audio data at the server of the conference system, perform the determining of the indication of the mispronounced keyword that forms the part of the audio data.

12. The system of claim 10, wherein the database of keywords includes an indication of a correct pronunciation of each of the keywords.

13. The system of claim 10, wherein the circuitry is configured to:
transmit a master playlist including an audio keyword playlist to one or more participants in the conference.

14. The system of claim 13, wherein the master playlist includes the audio data, an index location identifier, and a respective timestamp identifier associated with the audio data.

15. The system of claim 13,
wherein the master playlist includes one or more bitrate variants, and
wherein the replacing of the portion of the audio data having the indication of the mispronounced keyword, in substantially real time, with the corrected portion of the audio data is performed by referencing the master playlist including the one or more bitrate variants.

16. The system of claim 13,
wherein the master playlist includes the audio playlist comprising one or more bitrate variants,
wherein the one or more bitrate variants of the audio playlist comprises index location identifiers and respective timestamp identifiers.

17. The system of claim 13, wherein the circuitry is configured to:
transmit the audio data alongside separately transmitted audio keyword data as separate playlists as part of the master playlist including the audio keyword playlist, in order to update the portion of the audio data having the indication of the mispronounced keyword with a corrected portion of the audio data.

18. The system of claim 10, comprising:
a receiver of the conference,
wherein the circuitry is configured to:
decode, at the receiver of the conference, both the audio data without corrections and the corrected audio data.

19. The method of claim 4, wherein the audio keyword playlist comprises predetermined index location identifiers and associated keyword identifiers, and wherein the predetermined index location identifiers and associated keyword identifiers are used to replace mispronounced keywords and are transmitted as part of the audio playlist.

20. The system of claim 13, wherein the audio keyword playlist comprises predetermined index location identifiers and associated keyword identifiers, and wherein the predetermined index location identifiers and associated keyword identifiers are used to replace mispronounced keywords and are transmitted as part of the audio playlist.

* * * * *